US010457416B2

United States Patent
Nikitenko

(10) Patent No.: US 10,457,416 B2
(45) Date of Patent: Oct. 29, 2019

(54) PARACHUTE LANDING ASSISTANT

(71) Applicant: PLAKO LLC, Tucson, AZ (US)

(72) Inventor: Patrick Lee Nikitenko, Tucson, AZ (US)

( * ) Notice: Subject to any disclaimer, the term of this patent is extended or adjusted under 35 U.S.C. 154(b) by 0 days.

(21) Appl. No.: 15/908,691

(22) Filed: Feb. 28, 2018

(65) Prior Publication Data

US 2018/0251232 A1 Sep. 6, 2018

Related U.S. Application Data

(60) Provisional application No. 62/465,711, filed on Mar. 1, 2017.

(51) Int. Cl.
| | |
|---|---|
| *G08B 21/00* | (2006.01) |
| *B64D 45/04* | (2006.01) |
| *B64D 17/00* | (2006.01) |
| *G08B 21/02* | (2006.01) |
| *B64D 23/00* | (2006.01) |

(52) U.S. Cl.
CPC ............ *B64D 45/04* (2013.01); *B64D 17/00* (2013.01); *B64D 23/00* (2013.01); *G08B 21/02* (2013.01)

(58) Field of Classification Search
CPC ..... G01S 17/74; A42B 3/0433; A42B 3/0453; B64D 47/00; B64D 17/00; B64D 23/00; B64D 47/02
USPC ........................ 340/686.6, 691.1, 6.1, 815.45
See application file for complete search history.

(56) References Cited

U.S. PATENT DOCUMENTS

| | | | | |
|---|---|---|---|---|
| 5,622,337 A | * | 4/1997 | Unruh | B64D 23/00 244/142 |
| 9,175,837 B1 | * | 11/2015 | Leegate | A42B 3/0433 |
| 9,522,743 B1 | * | 12/2016 | Tolani | B64D 47/00 |
| 9,630,727 B1 | * | 4/2017 | Leegate | B64D 17/00 |
| 9,746,561 B2 | * | 8/2017 | Leegate | G01S 17/74 |
| 10,232,938 B2 | * | 3/2019 | Yates | B64C 39/024 |
| 2004/0119816 A1 | * | 6/2004 | Swain | A42B 3/042 348/61 |
| 2016/0150360 A1 | * | 5/2016 | Pope | H04W 4/02 340/8.1 |

* cited by examiner

*Primary Examiner* — Toan N Pham
(74) *Attorney, Agent, or Firm* — Martin S. High, P.C.

(57) ABSTRACT

The embodiments of the Parachute Landing Assistant are comprised of a battery pack, a power switch, an LED indicator light; an audio jack; a microcontroller; and a ground proximity sensor. The battery pack is comprised of a power storage means such as alkaline, lithium ion, or other types of battery system. The power switch allows the parachutist to enable or disable the operation of Parachute Landing Assistant. The LED indicator light is comprised of an LED that informs the parachutist as to whether the Parachute Landing Assistant operation is enabled or disabled. The audio jack is comprised of a standard ¼", ⅛", or 3/32" mono audio or stereo audio receptacle that accepts the analogous audio plug. The microcontroller controls all the other components of the Parachute Landing Assistant. The ground proximity sensor senses the distance from the ground of the parachutist.

1 Claim, 3 Drawing Sheets

PARACHUTE LANDING ASSISTANT

STATEMENT REGARDING FEDERALLY SPONSORED RESEARCH OR DEVELOPMENT

Not applicable

FIELD OF THE EMBODIMENTS

The field of the embodiments is parachuting equipment. More specifically, the field of the embodiments is ground proximity warning devices.

BACKGROUND OF THE EMBODIMENTS

When a parachutist begin approaches the ground for a landing they begin a flare. Many injuries upon landing due to improper procedures during this last phase of the parachute flight in manned and unmanned parachute systems. In 2015, there were reported 41 fatalities associated with parachuting worldwide many of those injuries due to a hard landing. See http://www.dropzone.com/fatalities/ (last accessed Feb. 22, 2017). For example, an experienced solo skydiver died due to a hard landing at Dillingham Air Field in Hawaii on Oct. 22, 2016. See http://khon2.com/2016/10/22/skydiver-injured-in-landing-at-dillingham-air-field/ (last accessed Feb. 22, 2017). Military parachute jumps are particularly subject to a hard landing during nighttime jumps. The key to a safe landing is accurate knowledge of the parachutist's distance to the ground.

The most common parachute altimeter is based on the ambient pressure, which are sometimes called mechanical altimeters as they depend on the status pressure of the ambient air. As the parachutist descends the ambient pressure increases. Once the ambient pressure reaches a predetermined level, the altimeter alerts to the proximity to the ground. Another technology employed is using GPS to determine the altitude of the ground at the location of the parachutist. Unfortunately, there is a lag time in using all GPS devices that makes their use too inaccurate for parachute landings. The main and major problem with altimeters based on ambient pressure is that they are inherently inaccurate to +/−30 feet and depend on calibration to the local elevation. The altimeter currently used to determine the flare usually 20 ft and down height for the jumper it is strictly a visual gauge by the solo jumper. Further, the vast majority of these altimeters are placed on the wrist of the parachutist. The parachute flare at this point in the jump requires split second decision making of the parachutist. At the point where the parachutist is required to flare the parachute for a landing, the user cannot spare valuable time to glance at the wrist mounted altimeter.

The purpose of the embodiments described herein is to provide an accurate and reliable device to determine altitude, distance and velocity to the ground for recreational and military parachutists as well as unmanned cargo delivery systems.

SUMMARY OF THE EMBODIMENTS

The embodiments of the Parachute Landing Assistant are comprised of a battery pack, a power switch, an LED indicator light; an audio jack; a microcontroller; and a ground proximity sensor. The battery pack is comprised of a power storage means such as alkaline, lithium ion, or other types of battery system. The power switch allows the parachutist to enable or disable the operation of Parachute Landing Assistant. The LED indicator light is comprised of an LED that informs the parachutist as to whether the Parachute Landing Assistant operation is enabled or disabled. The audio jack is comprised of a standard ¼", ⅛", or 3/32" mono audio or stereo audio receptacle that accepts the analogous audio plug. The microcontroller controls all the other components of the Parachute Landing Assistant. The ground proximity sensor senses the distance from the ground of the parachutist.

There has thus been outlined, rather broadly, the more important features of the embodiments of the Parachute Landing Assistant in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

DETAILED DESCRIPTION OF THE PREFERRED EMBODIMENTS

Figure 1:
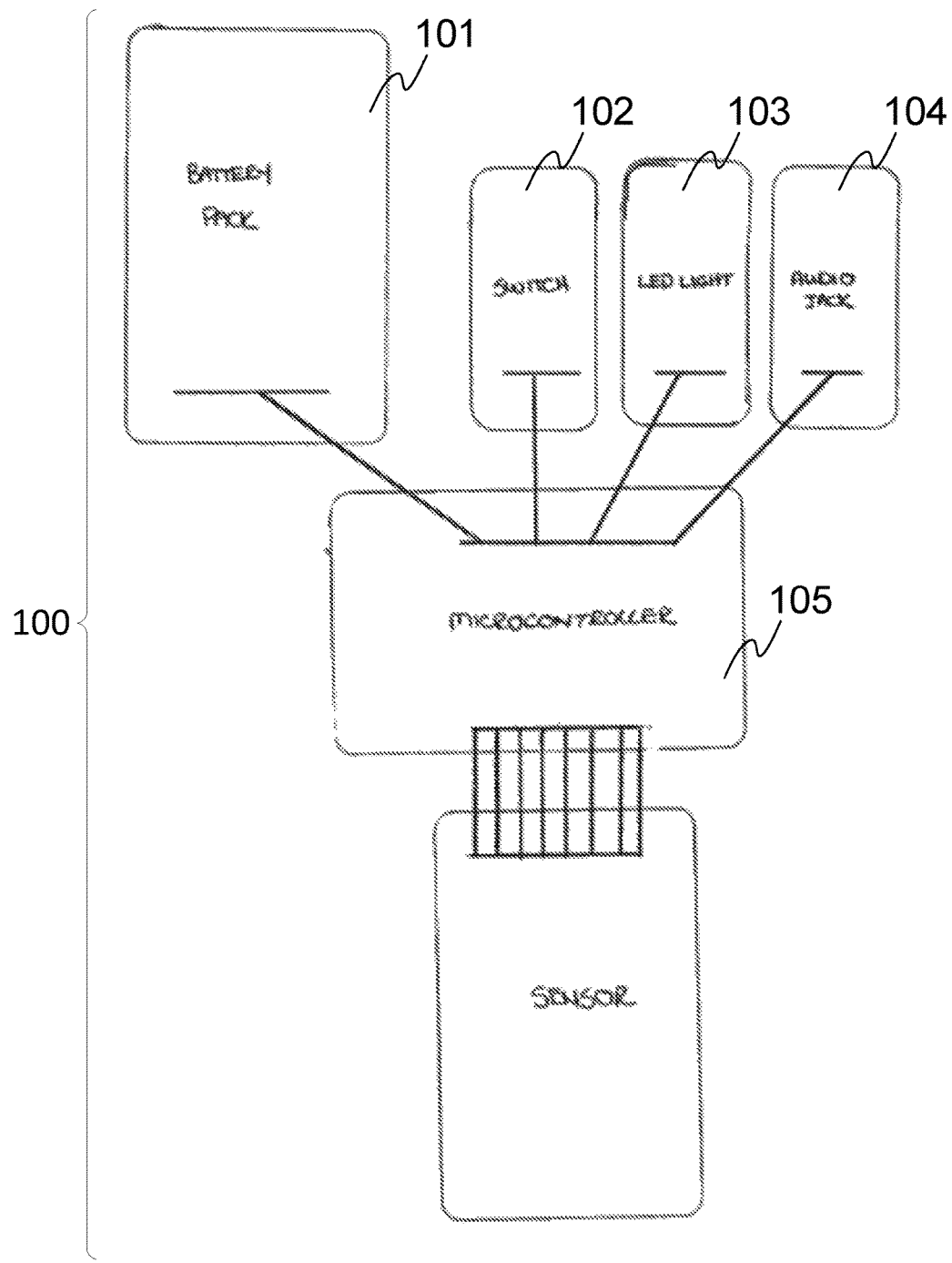
FIG. 1 is a schematic view of an embodiment of the Parachute Landing Assistant.
Figure 2:
FIG. 2 is a front view of parachutist showing one preferred placement of the Parachute Landing Assistant
Figure 3:
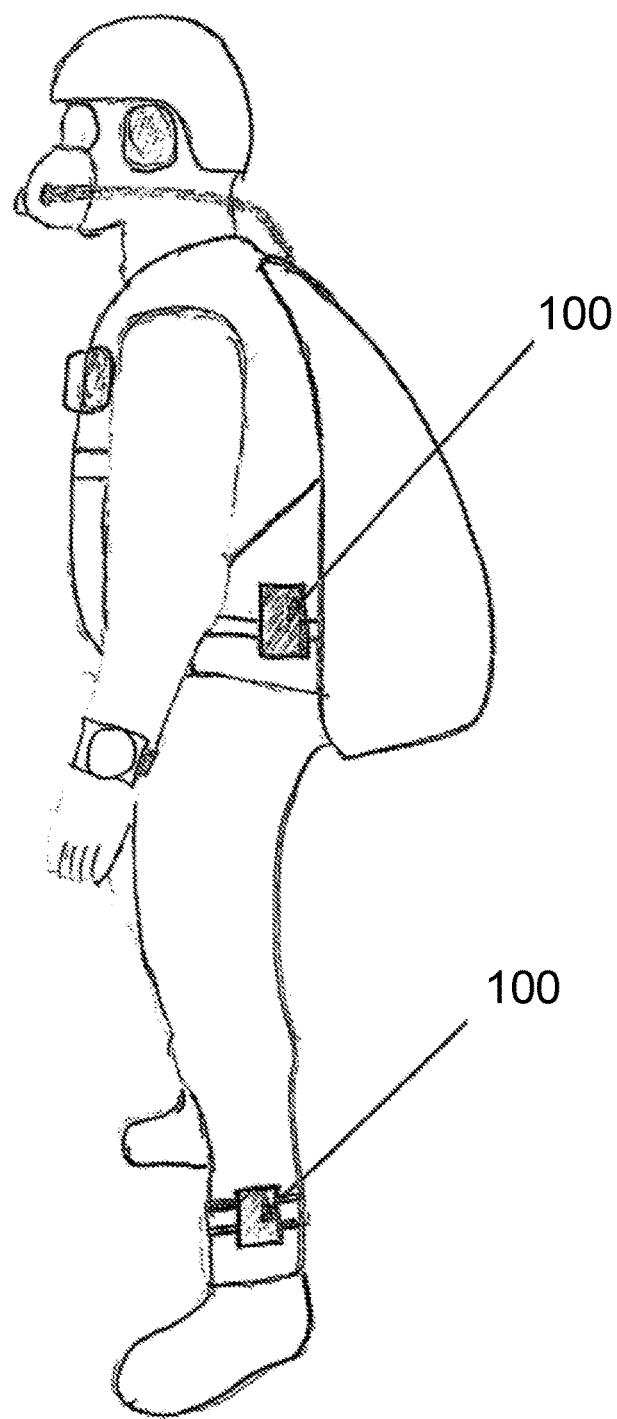
FIG. 3 is a side view of parachutist showing two additional preferred placements of the Parachute Landing Assistant.

Embodiments of the Parachute Landing Assistant 100 comprise a battery pack 101, a power switch 102, an LED indicator light 103; an audio jack 104; a microcontroller 105; and a ground proximity sensor 106.

The battery pack 100 is comprised of a power storage means such as alkaline, lithium ion, or other types of battery system. The battery pack 101 supplies 5V DC power to the microcontroller which in turn can supply power to the other components of the Parachute Landing Assistant.

The power switch 102 allows the parachutist to enable or disable the operation of Parachute Landing Assistant 100.

The LED indicator light 103 is comprised of an LED that informs the parachutist as to whether the Parachute Landing Assistant 100 operation is enabled or disabled.

The audio jack 104 is comprised of a standard ¼", ⅛", or ³⁄₃₂" mono audio or stereo audio receptacle that accepts the analogous audio plug. The audio jack 104 permits a tone or tones to be transmitted from the Parachute Landing Assistant 100 to the headset or helmet of the parachutist to alert the parachutist with a tone or tones as to the progress of the parachutist to the ground.

The microcontroller 105 controls all the other components of the Parachute Landing Assistant 100. In particular, the microcontroller 105 receives signals from the ground proximity sensor, interprets those signals, and alerts the parachutist when the parachutist reaches a pre-set distance from the ground. In another embodiment, the microcontroller 105 alerts the parachutist with a series of tones at pre-set distance intervals from the ground.

The ground proximity sensor 106 senses the distance from the ground of the parachutist. The ground proximity sensor 106 is comprised of but not limited to one or more of the following technologies: a LIDAR (light detection and ranging) LiDAR, LADAR sensor, a sonic sensor, Laser sensor, and an infrared sensor. The ground proximity sensor 106 is capable of detecting the distance of the parachutist from the ground.

What is claimed is:

1. A parachute landing assistant comprised of a battery pack; a power switch; an LED indicator light; an audio jack; a microcontroller; and LIDAR ground proximity sensor, wherein
    the battery pack is comprised of an alkaline or lithium ion battery system that supplies 5 V DC power to the microcontroller and other components; the power switch allows a parachutist to enable or disable operation of Parachute Landing Assistant;
    the LED indicator light informs the parachutist as to whether the Parachute Landing Assistant operation is enabled or disabled;
    the audio jack permits a tone or tones to be transmitted from the Parachute Landing Assistant to a headset or helmet of the parachutist to alert the parachutist with a tone or tones as to proximity of the parachutist to the ground;
    the microcontroller controls the components of the Parachute Landing Assistant;
    the microcontroller receives signals from the LIDAR ground proximity sensor, interprets those signals, and alerts the parachutist when the parachutist reaches a pre-set distance from the ground.

* * * * *